US010372821B2

(12) United States Patent
Chang et al.

(10) Patent No.: US 10,372,821 B2
(45) Date of Patent: Aug. 6, 2019

(54) IDENTIFICATION OF READING ORDER TEXT SEGMENTS WITH A PROBABILISTIC LANGUAGE MODEL

(71) Applicant: Adobe Inc., San Jose, CA (US)

(72) Inventors: Walter Chang, San Jose, CA (US); Trung Bui, San Jose, CA (US); Pranjal Daga, West Lafayette, IN (US); Michael Kraley, Lexington, MA (US); Hung Bui, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 30 days.

(21) Appl. No.: 15/462,684

(22) Filed: Mar. 17, 2017

(65) Prior Publication Data

US 2018/0267956 A1  Sep. 20, 2018

(51) Int. Cl.
*G06F 17/22* (2006.01)
*G06F 17/27* (2006.01)
*G06K 9/00* (2006.01)

(52) U.S. Cl.
CPC ...... *G06F 17/2775* (2013.01); *G06F 17/2715* (2013.01); *G06K 9/00469* (2013.01)

(58) Field of Classification Search
CPC ............ G06F 17/2715; G06F 17/2775; G06K 9/00469
See application file for complete search history.

(56) References Cited

U.S. PATENT DOCUMENTS

| | | | | | |
|---|---|---|---|---|---|
| 5,819,301 | A | * | 10/1998 | Rowe | G06F 17/211 715/235 |
| 5,832,530 | A | * | 11/1998 | Paknad | G06K 9/00463 715/235 |
| 6,067,514 | A | * | 5/2000 | Chen | G06F 17/2715 704/235 |
| 7,567,896 | B2 | * | 7/2009 | Coorman | G10L 13/06 704/10 |

(Continued)

OTHER PUBLICATIONS

Weinman et al., "Toward Integrated Scene Text Reading", IEEE Transactions on Pattern Analysis and Machine Intelligence, Feb. 2014, pp. 357-387.*

(Continued)

*Primary Examiner* — Maikhanh Nguyen
(74) *Attorney, Agent, or Firm* — Kilpatrick Townsend & Stockton LLP

(57) ABSTRACT

Certain embodiments identify a correct structured reading-order sequence of text segments extracted from a file. A probabilistic language model is generated from a large text corpus to comprise observed word sequence patterns for a given language. The language model measures whether splicing together a first text segment with another continuation text segment results in a phrase that is more likely than a phrase resulting from splicing together the first text segment with other continuation text segments. Sets of text segments, which include a first set with a first text segment and a first continuation text segment as well as a second set with the first text segment and a second continuation text (Continued)

segment, are provided to the probabilistic model. A score indicative of a likelihood of the set providing a correct structured reading-order sequence is obtained for each set of text segments.

16 Claims, 8 Drawing Sheets

(56) References Cited

U.S. PATENT DOCUMENTS

| | | | | |
|---|---|---|---|---|
| 7,774,192 B2* | 8/2010 | Chang | G06F 17/2827 | 704/2 |
| 7,917,350 B2* | 3/2011 | Mori | G06F 17/2863 | 704/10 |
| 8,539,342 B1* | 9/2013 | Lewis | G06F 17/212 | 715/243 |
| 8,650,026 B2* | 2/2014 | Ehsani | G10L 15/193 | 704/10 |
| 8,831,943 B2* | 9/2014 | Emori | G10L 15/197 | 704/251 |
| 9,342,504 B2* | 5/2016 | Ehsani | G06F 17/2775 | |
| 9,811,727 B2* | 11/2017 | Koh | G06K 9/00469 | |
| 2002/0128821 A1* | 9/2002 | Ehsani | G10L 15/193 | 704/10 |
| 2006/0150069 A1* | 7/2006 | Chang | G06F 17/2827 | 715/264 |
| 2007/0260564 A1* | 11/2007 | Peters | G06F 17/27 | 706/14 |
| 2008/0228463 A1* | 9/2008 | Mori | G06F 17/2715 | 704/2 |
| 2010/0063819 A1* | 3/2010 | Emori | G10L 15/197 | 704/251 |
| 2013/0173255 A1* | 7/2013 | Ehsani | G10L 15/193 | 704/9 |
| 2014/0136189 A1* | 5/2014 | Ehsani | G06F 17/2775 | 704/9 |

OTHER PUBLICATIONS

Momtazi et al., "A Possibilistic Approach for Building Statistical Language Models", IEEE 2009 Ninth International Conference on Intelligent Systems Design and Applications, pp. 1014-1018.*

Tsujimoto, S. Asada, H. Understanding multi-articled documents. In Proceedings of the 10th International Conference on Pattern Recognition. (1990) 551-556.

Matthew Hurst and Tetsuya Nasukawa. Layout and language: integrating spatial and linguistic knowledge for layout understanding tasks. In Proceedings of COLING—18th conference on Computational linguistics . (2000) 334-340.

Aiello, M., Monz, C., Todoran, L., Worring, M. Document understanding for a broad class of documents. International Journal on Document Analysis and Recognition—IJDAR 5(1) (2002) 1-16.

Aiello, M, Smeulders, A.M.W. Thick 2d relations for document understanding. Technical Report # DIT-02-0063, Univ. of Amsterdam, (2002).

Breuel, T.M.: High performance document layout analysis. In Proceedings of the 2003 Symposium on Document Image Understanding (SDIUT '03). (2003).

Tomas Mikolov, Martin Karafiat, Lukas Burget, Jan "Honza" Cernocky, Sanjeev Khudanpur. Recurrent neural network based language model. In Proceedings of INTERSPEECH (2010). 1045-1048.

Sepp Hochreiter, Jürgen Schmidhuber. Long Short-Term Memory. Journal Neural Computation: vol. 9 Issue 8, Nov. 15, 1997. pp. 1735-1780.

R. Collobert, K. Kavukcuoglu, C. Farabet. Torch7: A MATLAB-like environment for machine learning. In BigLearn, NIPS Workshop, 2011.

B Zoph, A Vaswani, J May, K Knight. Simple, Fast Noise-Contrastive Estimation for Large RNN Vocabularies. In NAACL, 2016.

* cited by examiner

Paragraph1　　　Paragraph2　　　Paragraph3
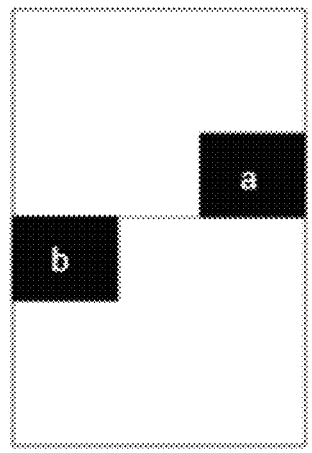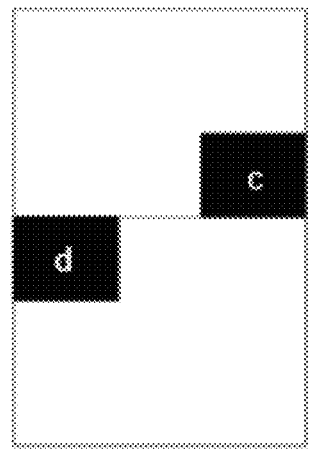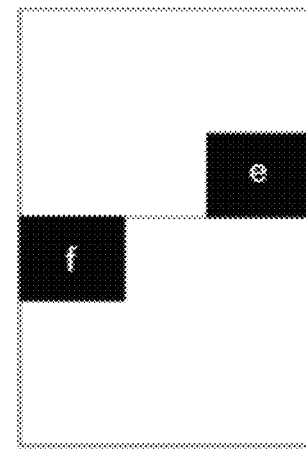
FIG. 4

US 10,372,821 B2

IDENTIFICATION OF READING ORDER TEXT SEGMENTS WITH A PROBABILISTIC LANGUAGE MODEL

FIELD OF THE DISCLOSURE

This disclosure relates generally to the field of data processing and more particularly to processing of structured documents.

BACKGROUND

Documents formatted in a portable document format, such as PDF, are commonly used to simplify the display and printing of structured documents. Such documents permit incorporation of a mix of text and graphics to provide a visually pleasing and easy to read document across heterogeneous computing environments. It is estimated that there are currently about 2.5 trillion files on the World Wide Web encoded as PDF documents.

It is often necessary to extract text from a document encoded in a portable document format to, for example, (1) read a document out loud, (2) reflow a document for viewing on the small screen of a mobile device, (3) help make the reading of PDFs more accessible for visually impaired and motion-impaired users, (4) copy text for pasting into another document, or (5) analyze document text, search for phrases, operate on text such as summarization, export to another format. Current tools can identify contiguous portions of text but unfortunately do not accurately identify discontinuous portions of text, for example, text that may be in multiple columns and that may be interspersed around images or other visual elements.

Generating documents with tags to indicate portions of text can help, but many existing documents are not tagged, and tagging tools cannot always correctly tag existing documents. Segmenting and labeling segments such as "title" and "body" has been proposed as a solution. Use of spatial information within a document to determine document structure has also been proposed, as has topological sorting to determine reading order. Unfortunately, none of these solutions provides a sufficiently flexible solution for the large number of existing documents encoded in a portable document format.

BRIEF DESCRIPTION OF THE DRAWINGS

The accompanying drawings, which are incorporated in and constitute a part of this specification exemplify the embodiments of the present invention and, together with the description, explain and illustrate principles of the inventive techniques disclosed herein. Specifically:

FIG. 4 is an illustration of paragraph segments employed by an embodiment.

DETAILED DESCRIPTION

Figure 1:
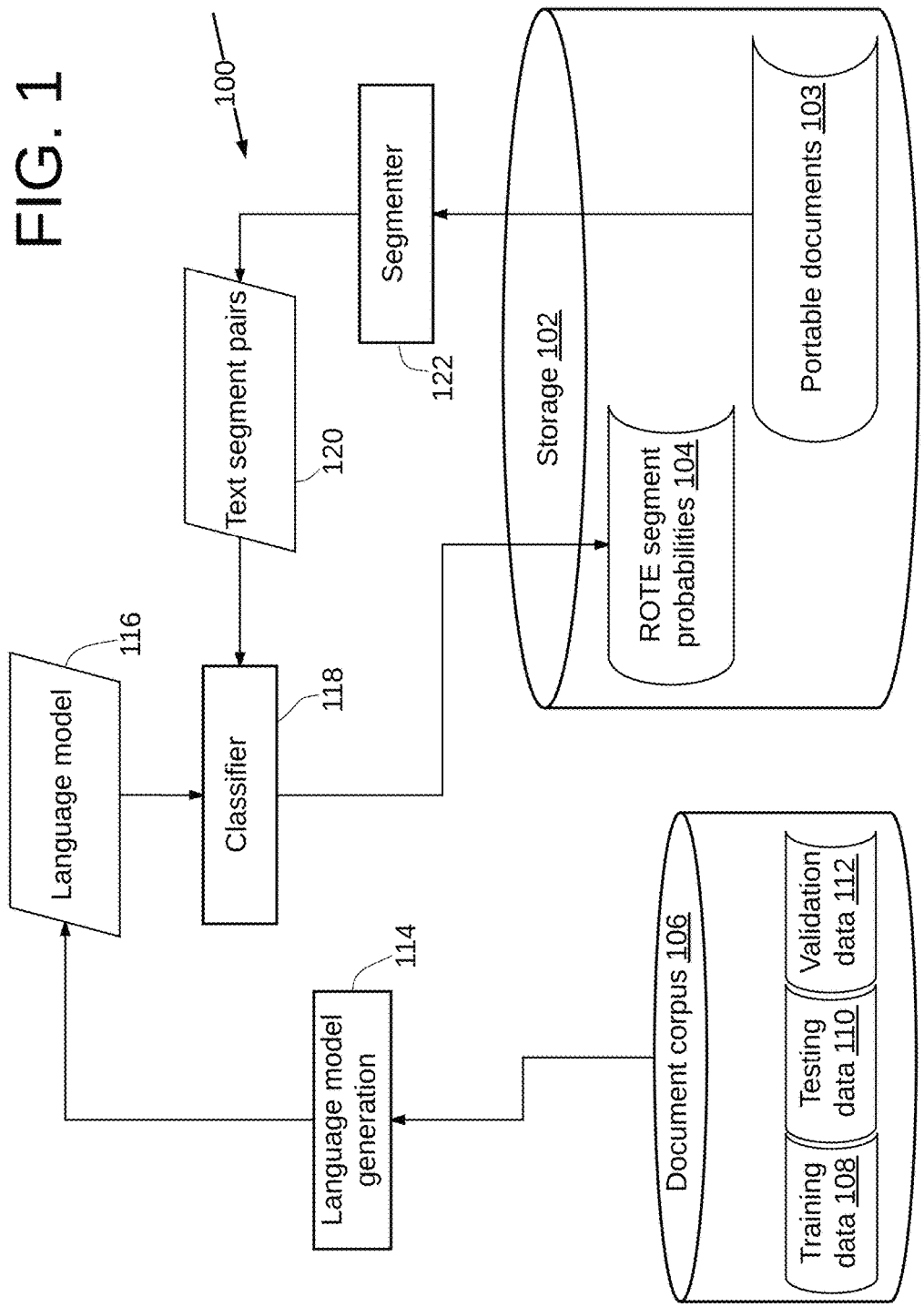
FIG. 1 is a high-level flowchart illustrating language model generation and generation of probabilities for Reading Order Text Extraction segments in accordance with embodiments of the invention.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The systems and method disclosed herein improve generation of Reading Order Text Extraction (ROTE) from documents encoded in a portable document format by generating a probabilistic language model of observed word sequence patterns from a large text corpus for a given language. The probabilistic language model measures whether splicing together a first text segment with another continuation text segment results in a phrase that is more likely than a phrase resulting from splicing together the first text segment with other continuation text segments. A plurality of sets of text segments are provided to the probabilistic model to generate a probability score for each set of text segments. The text segments include a first set including the first text segment and a first continuation text segment, and a second set including the first text segment and a second continuation text segment. The probability score is indicative of a likelihood of the set providing a correct structured reading-order sequence.

The embodiments disclosed herein use learned natural language patterns by building a language model from a large corpus of sentence text. The language model allows the system to accurately suggest whether a constructed text segment made from a given text segment and a candidate continuation text segment is probable or not. Current solutions for ROTE from documents encoded in a portable document format do not exploit the power of language models. Additionally, current approaches to ROTE generally reflect a clear domain specificity. For instance, the classification of blocks as 'title' and 'body' is appropriate for magazine articles, but not for administrative documents. Moreover, much of the work has been done keeping scientific articles in mind, and not general purpose documents.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and appended claims.

FIG. 1 is a high-level flowchart illustrating an embodiment of a system that generates a probabilistic language model and employs that model to identify reading order of text segments that are visually discontinuous but in a visually understandable reading order to a human reader of a document encoded in a portable document format. A statistical language model is a probability distribution over sequences of words. Given such a sequence, say of length m, it assigns a probability $P(w_1, \ldots, w_m)$ to the whole sequence. In FIG. 1, a computer system, shown generally at 100, includes digital storage 102 that stores documents 103 encoded in a portable document format, and Reading Order Text Extraction (ROTE) segment probabilities 104.

A portable document format is a file format used to present documents in a manner independent of application software, hardware, and operating systems. Each portable document file encapsulates a complete description of a fixed-layout flat document, including the text, fonts, graphics, and other information needed to display it. A well-known example of a portable document format is the PDF format developed by Adobe Systems Incorporated and adopted by the International Organization for Standardization as ISO 32000-1 and 32000-2. A PDF document that is transmitted, such as by e-mail, from one computer platform, such as a Windows personal computer will appear the same on the screen of a receiving computer, even one that runs a different operating system, such as an Apple Mac, and will also appear the same visually when printed.

Figure 2:
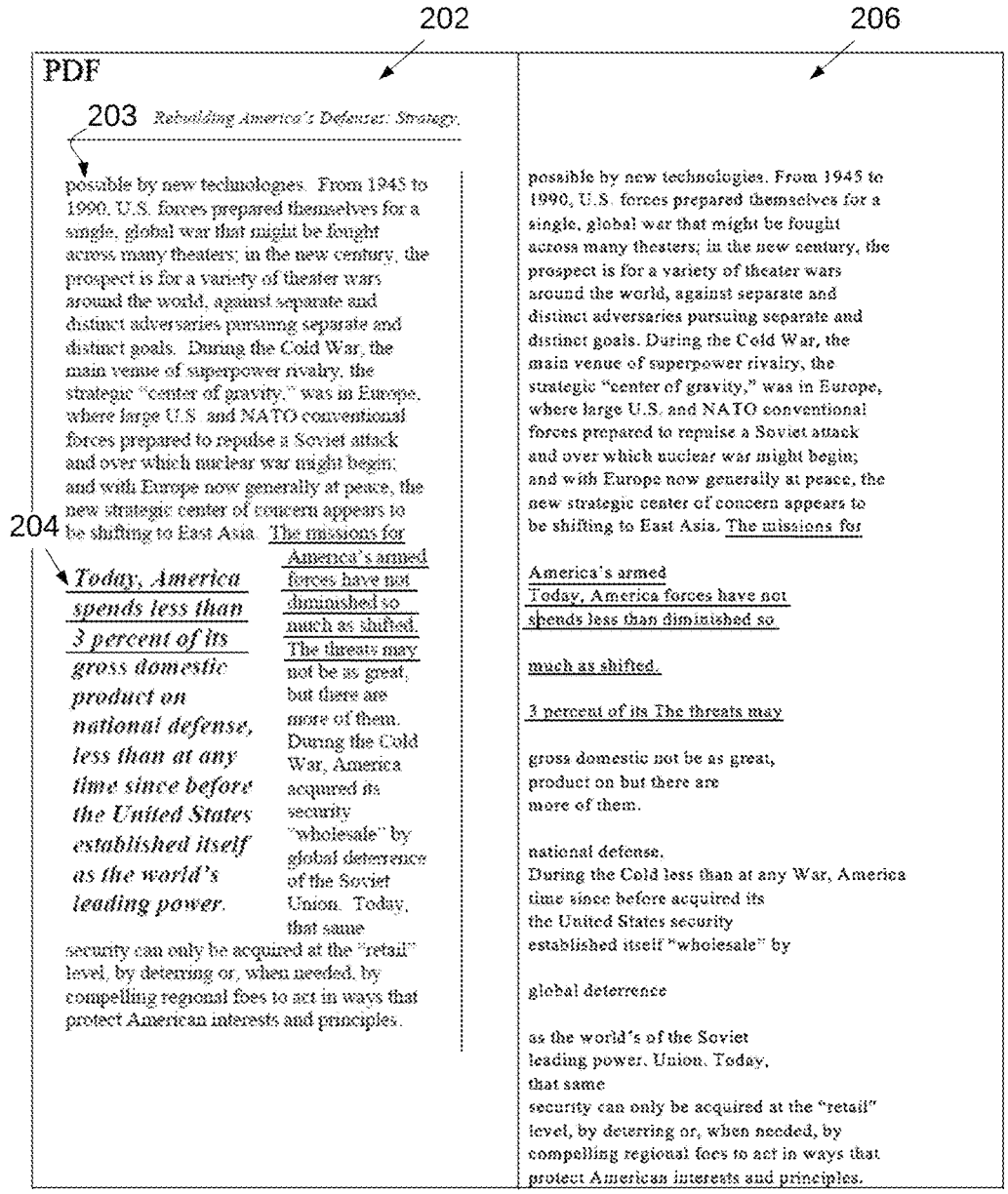
FIG. 2 shows a sample PDF file with a sample output from a known Reading Order Text Extraction technique.

As noted, current approaches to Reading Order Text Extraction (ROTE) do not provide accurate results across a variety of different documents encoded in a portable document format such as PDF. Consider the example shown in FIG. 2 which shows on the left side at 202 a PDF document of an article with the main body of text 203 formatted around an inset box shown at 204. While the inset box 204 inserts a visual discontinuity to the flow of text 203 the proper reading order is visually perceptible to a human reader. Unfortunately, ROTE output from a known technique, shown on the right at 206 provides an incorrect reading order. As seen from the underlined text in 206, the attempt at ROTE fails due to incorrectly locating and splicing together continuing sentence segments across paragraphs and inset boxes. The extracted text segments shown in 206 are shown numbered below:

[1] The missions for
[2] America's armed
[3] Today, America [4] forces have not
[5] spends less than [6] diminished so
[7] much as shifted.
[8] 3 percent of its [9] The threats may
The splicing of candidate text segments:
1-2, 2-3, 3-4, 4-5, 5-6, 6-7, 7-8, and 8-9,
do not make much sense. However, a good language model will tell us that the text segment splices:
1-2, 2-4, 4-6, 6-7, 7-9 and separately, 3-5, 5-8,
are much more reasonable (i.e., more likely) using a language model that considers a large number (e.g. thousands) of documents.

Turning back to FIG. 1, digital storage 102 is shown generally but can take a variety of forms of storage for digital content including storage that is spread physically across numerous storage devices and also that is partially or wholly distant physically from other portions of system 100. Document corpus 106 is preferably a large collection of documents in a language of interest that provides statistically correct sentence text. The documents may be stored in a variety of formats and may be stored within digital storage 102 or separately from digital storage 102. In one embodiment, the documents in document corpus 106 are stored in text format and in another embodiment, are stored in a portable document format such as PDF. In other embodiments, the documents in the document corpus may be stored in a variety of formats. One example of a document corpus 106 is the collection of documents, or some subset, made available by the Gutenberg Project, details of which may be found at Gutenberg.org. The Gutenberg Project includes more than 50000 e-books, which provides a sufficiently large corpus of sentence data to permit training of the models described herein. Moreover, the text format of Gutenberg provides a good paragraph-wise distribution of text to provide well-defined reading order candidates. Document corpus 106 includes training data 108, testing data 110 and validation data 112, each of which is a distinct set of documents. In other words, testing data 110 is comprised of a different set of documents from document corpus than training data 108 and validation data 112, and validation data 112 is comprised of a different set of documents than training data 108 and testing data 110. The document corpus may be of one of a variety of languages and in a preferred embodiment is in the English language.

Figure 3:
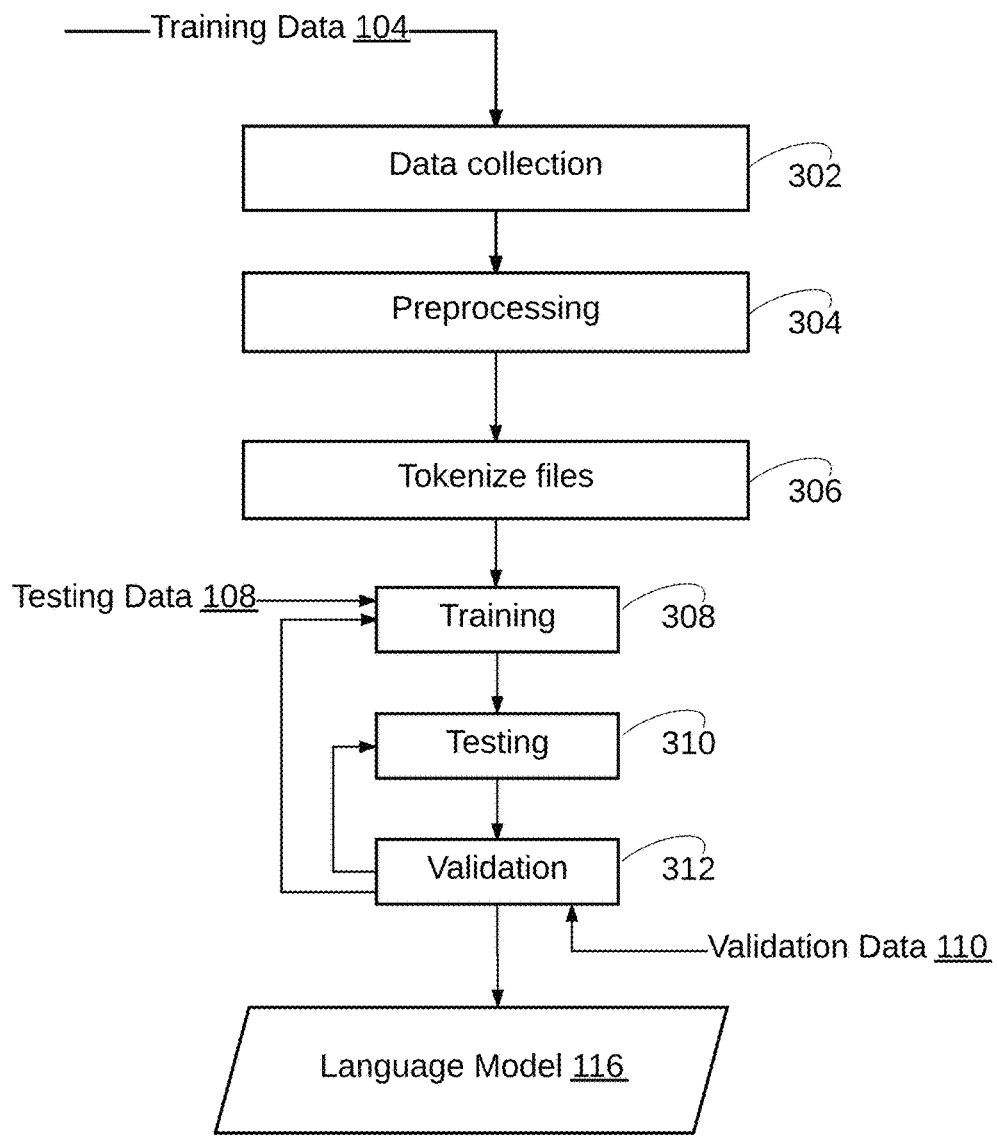
FIG. 3 is a flowchart illustrating steps for generation of a language model in accordance with various embodiments.

Language model generation module 114 generates probabilistic language model 116 which is used by classifier 118 to generate ROTE segment probabilities 104 from text segment pairs 120 generated by segmenter 122 from portable documents 103. FIG. 3 is a flowchart illustrating steps implemented by language model generation module 114 to generate language model 116. At step 302, a corpus of documents to form training data 108 is collected such as by identifying and copying files to document corpus 106 which may take the form of a file system for storing documents. The collected files are preprocessed at step 304 to concatenate all of the collected files into a single file and to remove extraneous characters to generate a file comprised of textual characters organized as sentences with associated punctuation. At step 306, the file is further processed to generate a token for each word in the file for use in training, testing and validation steps 308, 310 and 312. Tokens are words and all the tokens form a vocabulary.

In a first embodiment, language model generation module 114 employs an n-gram model, and in particular, a 3-gram model, otherwise known as a trigram model. An n-gram model is a type of probabilistic language model that may be used to predict the next item in a sequence. An n-gram model models sequences, notably natural languages, using the statistical properties of n-grams. More concisely, an n-gram model predicts $x_i$ based on $$x_{i-(n-1)}, \ldots, x_{i-1}$$

Expressed in probability terms this can be seen as $$P(x_i | x_{i-(n-1)}, \ldots, x_{i-1})$$

An n-gram model in language modeling, employs independence assumptions so that each word depends only on the last n−1 words. This Markov model is used as an approximation of the true underlying language. This assumption simplifies the problem of learning the language model from data. In other words, the probability of a word is conditioned on some number of previous words (one word in a bigram model, two words in a trigram model, etc.). Training of the 3-gram model preferably includes smoothing via a modified Kneser-Ney Smoothing to smooth the probability distributions generated by the n-gram model by assigning non-zero probabilities to unseen words. Kneser-Ney smoothing operates to calculate the probability distribution of n-grams in a document based on their histories. It employs absolute discounting by subtracting a fixed value from the probability's lower order terms to omit n-grams with lower frequencies. By way of example, if the bigram "San Francisco" appears many times in a training corpus, the frequency of the unigram "Francisco" will also be high. Relying on the unigram frequency to predict the frequencies of n-gram frequencies will skew results. Kneser-Ney smoothing corrects this by considering the frequency of the unigram in relation to possible words preceding it.

N-gram models tend to not perform very well on cross sentence boundaries. Consequently, the module 114 in the n-gram embodiment splits all paragraphs in the training documents 108 into two paragraph segments, as shown in FIG. 4, which shows paragraph 1 split into segments a and b, paragraph 2 split into segments c and d and paragraph 3 split into segments e and f. In FIG. 4, the reading order candidates are segments b, d and f.

Testing 310 and validation 312 are performed iteratively by employing data sets that are distinct from training data 108. In one embodiment, the document corpus 106 includes 35000 e-books for training data 108, 10000 e-books for testing data 110 and 5000 e-books for validation data 112. Validation data can be repeatedly used during the training to computer model parameters. However, the testing data can be only used on to test the performance of the model.

An n-gram model has limitations, which include: (1) performing an exact match of histories and not considering similar ones; (2) problems with representing patterns over more than a few words due to the Markov assumption inherent in an n-gram model; (3) exponential increase of the number of possible parameters with increasing order of the n-gram model; (4) never enough training data to estimate parameters of higher order n-gram models. On the other hand, in neural network based language models, sparse history is projected into some continuous low-dimensional space, where similar histories get clustered. Moreover, neural network based models are more robust as parameters are shared among similar histories, thereby reducing the number of parameters to be estimated.

In an alternative embodiment, language generation module 114 and more specifically, step 308, employs a Recurrent Neural Network (RNN), and in particular, a particular kind of RNN known as a Long Short Term Memory (LSTM) network, which is capable of learning long-term dependencies. Since LSTM models are capable of learning longer term dependencies, this embodiment takes whole sentence sequences into account rather than just two words as in case of the 3-gram model. A RNN accepts an input vector and provides an output vector that is a function of, in other words that it is influenced by, the history of the input vectors provided. Since RNNs do not make a simplifying Markov assumption, they consider long term dependencies when modelling natural language. They also allow operation over sequence of vectors and have greater representational power. RNN's operate by employing a sigmoid function, i.e. a bounded differentiable real function that is defined for all real input values and has a positive derivative at each point. By taking derivatives over multiple steps, RNN's exhibit what is commonly known as a vanishing gradient problem. In other words, the effect of earlier values can become negligible. An LSTM network addresses the vanishing gradient problem by permitting propagation of selected values to enable learning of longer term dependencies. Aspects of LSTM models are described by Sepp Hochreiter, and Jurgen Schmidhuber in *Journal Neural Computation:* Volume 9 Issue 8, Nov. 15, 1997 Pages 1735-1780.

An LSTM network operates in a manner to permit propagation of selected values. An LSTM network consists of a chain of repeating modules of a neural network. Each module has a cell state which may be changed by removing or adding information by way of three types of gates: input, forget, output. The forget gate provides a number between 0 and 1 to indicate the amount of information to pass through. A zero value indicates that no information will be passed and a one value indicates that all information will be passed. The input gate defines how much of the newly computed state for the current input to pass through. The output gate defines how much of the internal state to expose to the external network (higher layers and the next time step).

Figure 5:
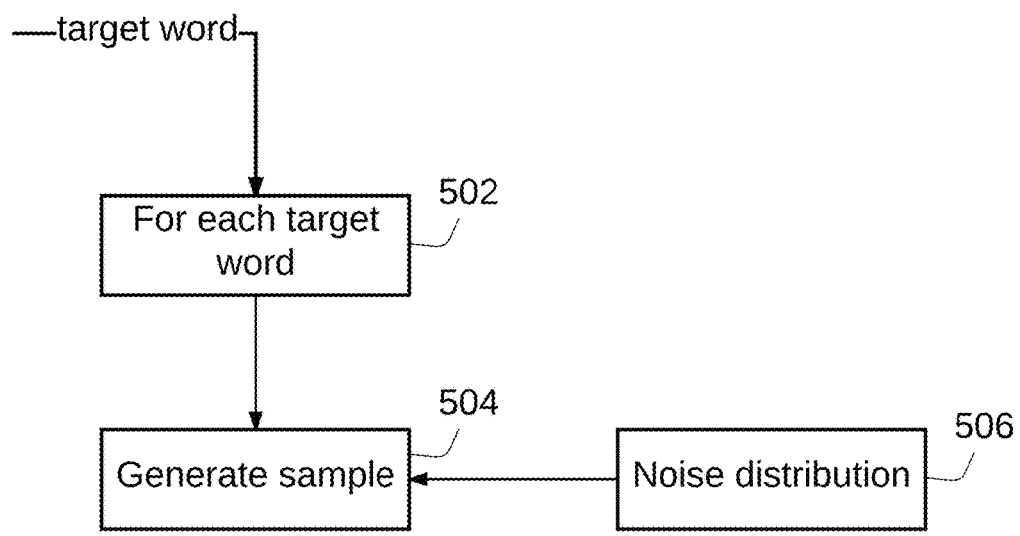
FIG. 5 is a flowchart illustrating operation of an embodiment to reduce memory usage.

Output of an LSTM can cause a bottleneck when training with a large number of files, i.e., large vocabularies (800,000 for 35,000 files). For a batch size=128 (number of sequences per batch) and a sequence length=50 (size of sequence to back propagate through time), the output of that layer will have a shape sequence length×batch size×vocab size, or 128×50×800000. For a Float Tensor or Cuda Tensor in Torch7 as described by B Zoph, A Vaswani, J May, and K Knight, in *Simple, Fast Noise-Contrastive Estimation for Large RNN Vocabularies*, NAACL, 2016 a single tensor will take up 20 GB of memory. Thus, the approximate memory consumption of a 4-layer LSTM with 2048 units will be 80 GB, which is computationally very expensive. Consequently, Noise Contrastive Estimation (NCE) as described by B. Zoph et al. may be employed as shown in FIG. 5. In NCE, for each target word 502 (the likelihood of which we want to maximize), some words are sampled 504 from a noise distribution 506, which is typically the unigram distribution.

Figure 6:
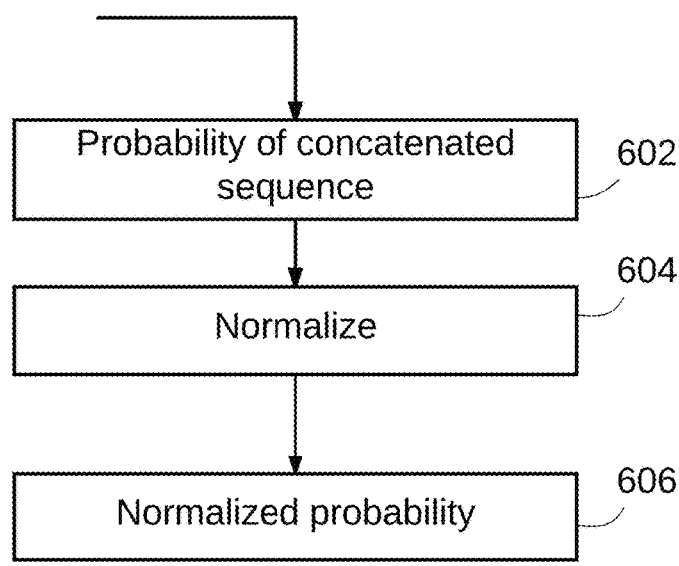
FIG. 6 is a flowchart illustrating output of an embodiment of a language model.

For testing, and in an operational mode, the last incomplete sentence of a paragraph segment is concatenated with the next three reading order candidates, which correspond to first incomplete sentence of the next three paragraph segments (paragraph segments b, d, f in FIG. 4). The LSTM model then provides, as shown in FIG. 6, the probability of these concatenated sequences 602, which is then normalized 604 by the length of the concatenated sequence to provide a normalized probability 606. This is done to prevent the length of the sentence affect its likelihood in becoming the reading order candidate.

Figure 7A:
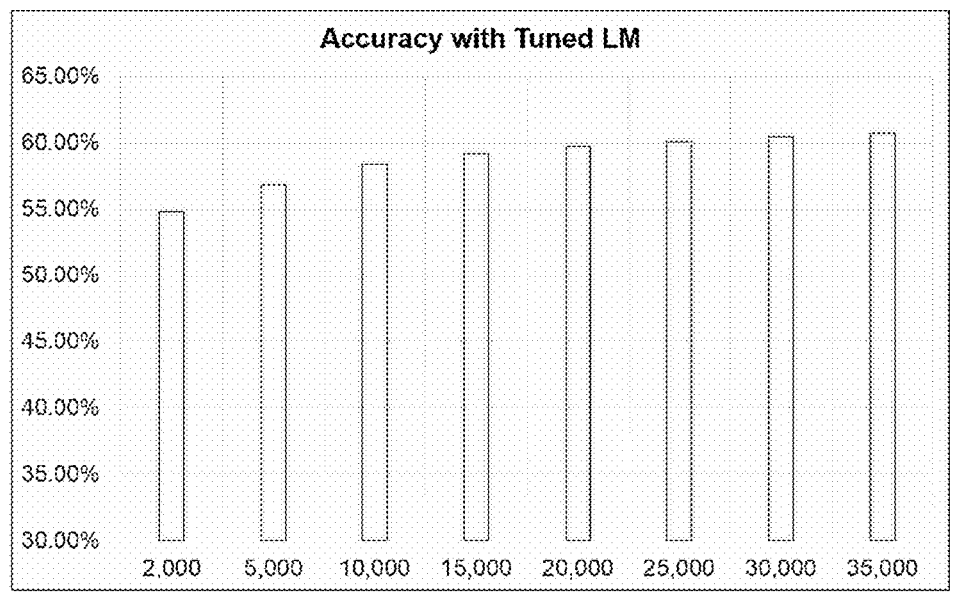
FIGS. 7A and 7B are graphs illustrating performance of two embodiments of language models.
Figure 7B:
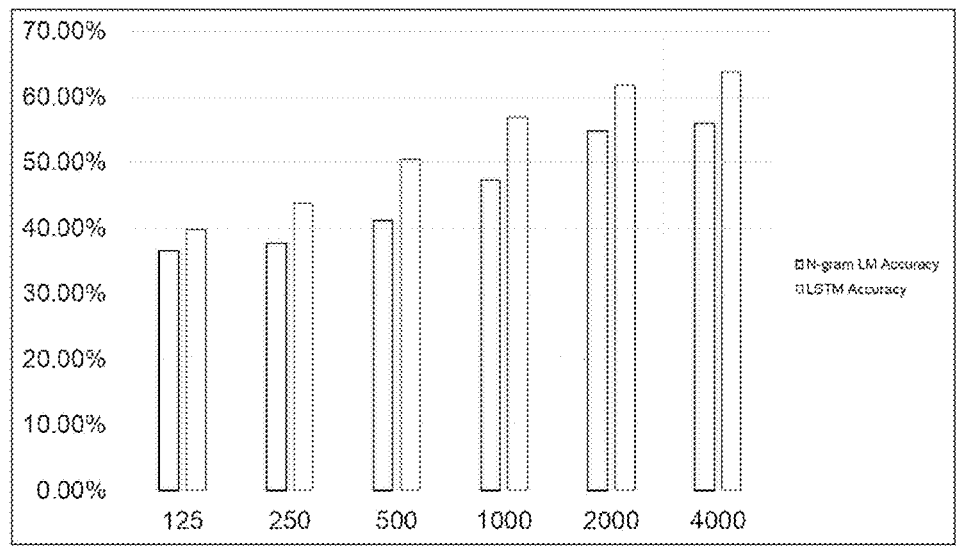

FIGS. 7A and 7B are graphs illustrating performance of the n-gram and LSTM embodiments. The results of the 3-gram model, are shown in FIG. 7A which depicts the accuracy in determining the correct reading order among the three candidates. With more training data, the accuracy of the model increases from approximately 55% with 2000 files to approximately 61% with 35000 files. FIG. 7B depicts the accuracy in determining the correct reading order as between the n-gram and the LSTM model. For the n-gram and LSTM output pairs shown in FIG. 7B, the n-gram output is the left bar and the LSTM output is the right bar. It can be noticed that LSTMs outperform the baseline n-gram models in detecting the correct reading order of a document. Moreover, with only 2000 training files, the LSTM model performed better than the n-gram model trained on all 35000 training files. For 4000 training files, the LSTM embodiment provided a higher accuracy of approximately 64%.

Figure 8:
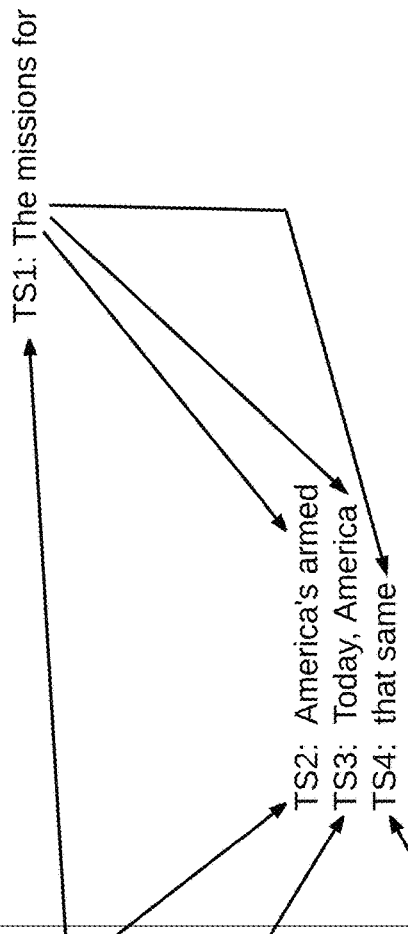
FIG. 8 illustrates operation of classifier 118 of FIG. 1.

Turning back to FIG. 1, classifier 118 operates on text segment pairs 120 to generate ROTE segment probabilities 104 from language model 116. Segmenter 122 generates text segment pairs 120 from a selected portable document file 103. The text segment pairs take the form of a plurality of sets of text segment pairs as shown in FIG. 8. As seen in FIG. 8, three text segment pairs are generated for processing by classifier 118 to identify a likely candidate continuation text segment for base text segment TS1:

TS1, TS2
TS1, TS3
TS1, TS4

The classifier 118 provides for each text segment pair a probability score indicating the likelihood that the candidate continuation text segment (TS2, TS3, TS4) represents the proper reading order continuation text segment for the base text segment (TS1). In the example shown in FIG. 8, the text segment pair (TS1, TS2) would have a higher probability score than pairs (TS1, TS3) and (TS1, TS4), and would hence be selected as the set of text segments as being more likely to provide the correct structured reading-order sequence. In such an embodiment, the text segment pair with the highest probability score is treated as the text segment pair that is more likely than other text segment pairs to provide the correct structured reading-order sequence.

Figure 9:
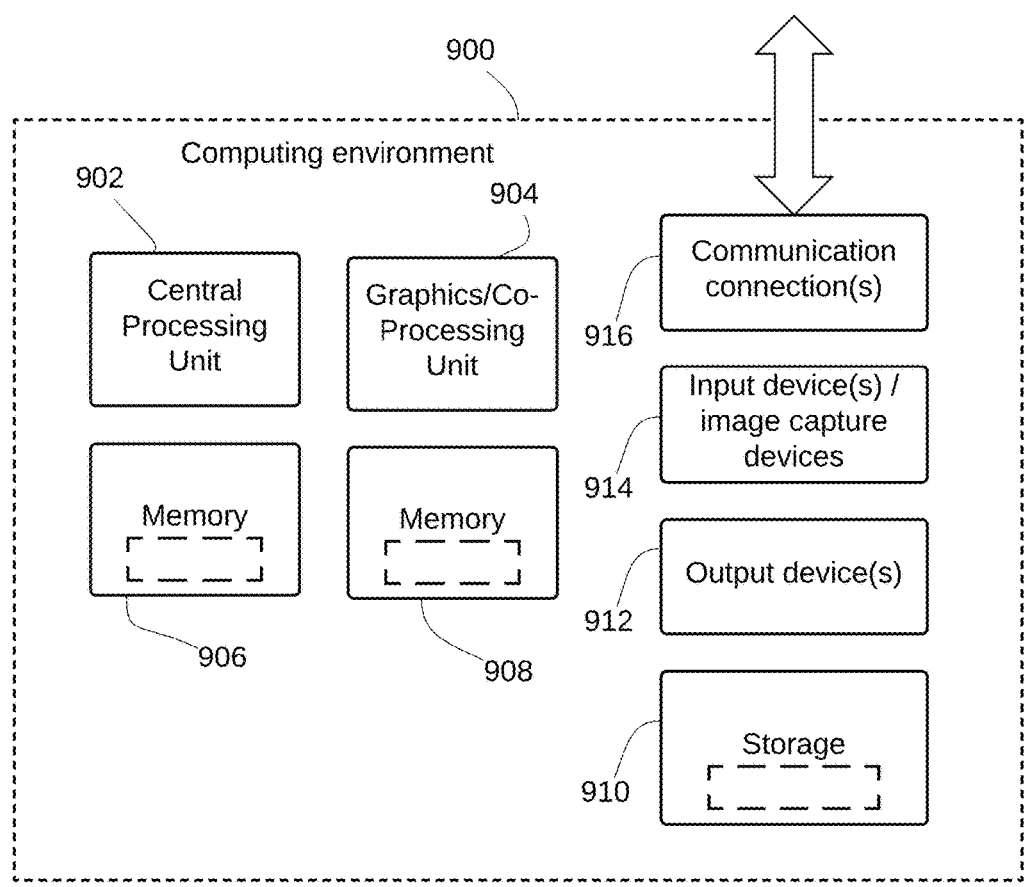
FIG. 9 illustrates a block diagram of hardware that may be employed in various embodiments.

FIG. 9 depicts a generalized example of a suitable general purpose computing system 900 in which the described innovations may be implemented in order to improve the processing speed and efficiency with which the computing system 900 provides probabilities for candidate text segment pairs for performing ROTE. With reference to FIG. 9, the computing system 900 includes one or more processing units 902, 904 and memory 906, 908. The processing units 902, 904 execute computer-executable instructions. A processing unit can be a general-purpose central processing unit (CPU), processor in an application-specific integrated circuit (ASIC) or any other type of processor. The tangible memory 906, 908 may be volatile memory (e.g., registers, cache, RAM), non-volatile memory (e.g., ROM, EEPROM, flash memory, etc.), or some combination of the two, accessible by the processing unit(s). The hardware components in FIG. 9 may be standard hardware components, or alternatively, some embodiments may employ specialized hardware components to further increase the operating efficiency and speed with which the system 100 operates.

Computing system 900 may have additional features such as for example, storage 910, one or more input devices 914, one or more output devices 912, and one or more communication connections 916. An interconnection mechanism (not shown) such as a bus, controller, or network interconnects the components of the computing system 900. Typically, operating system software (not shown) provides an operating system for other software executing in the computing system 900, and coordinates activities of the components of the computing system 900.

The tangible storage 910 may be removable or non-removable, and includes magnetic disks, magnetic tapes or cassettes, CD-ROMs, DVDs, or any other medium which can be used to store information in a non-transitory way and which can be accessed within the computing system 900. The storage 910 stores instructions for the software implementing one or more innovations described herein.

The input device(s) 914 may be a touch input device such as a keyboard, mouse, pen, or trackball, a voice input device, a scanning device, or another device that provides input to the computing system 900. For video encoding, the input device(s) 914 may be a camera, video card, TV tuner card, or similar device that accepts video input in analog or digital form, or a CD-ROM or CD-RW that reads video samples into the computing system 900. The output device(s) 912 may be a display, printer, speaker, CD-writer, or another device that provides output from the computing system 900.

The communication connection(s) 916 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or another carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer implemented method for identifying correct structured reading-order sequences of text segments extracted from a file, the method including one or more processing devices performing operations comprising:

accessing a probabilistic language model of observed word sequence patterns that computes (i) a first likelihood that a phrase obtained by splicing a text segment together with a continuation text segment has a correct reading order and (ii) a second likelihood that an additional phrase obtained by splicing the text segment together with another continuation text segment has the correct reading order, wherein the probabilistic language model is (i) trained with tokenized data obtained from a first text corpus for a given language and (ii) validated against a second text corpus distinct from the first text corpus, the tokenized data comprising tokens respectively corresponding to sets of textually encoded characters generated from the first text corpus;

providing, to the probabilistic language model, (i) a first set of text segments having a first text segment and a corresponding first continuation text segment and (ii) a second set of text segments having the first text segment and a corresponding second continuation text segment;

computing, with the probabilistic language model, a first score and a second score, the first score indicating a likelihood of the first text segment and the corresponding first continuation text segment providing a correct structured reading-order sequence, the second score indicating a likelihood of the first text segment and the corresponding second continuation text segment providing the correct structured reading-order sequence; and outputting, based on the first score and the second score, a reading order text extraction for sequencing a set of text strings on a display device.

2. The computer implemented method of claim 1, wherein the probabilistic language model comprises an n-gram model trained on a text corpus.

3. The computer implemented method of claim 1, wherein the probabilistic language model comprises a recurrent neural network trained on a text corpus.

4. The computer implemented method of claim 3, wherein the recurrent neural network comprises a long short term memory system that learns language patterns over entire sentences.

5. The computer implemented method of claim 4, the operations further comprising reducing memory consumption by the long short term memory system by sampling selected target words from a noise distribution.

6. The computer implemented method of claim 4 wherein an output of the long short term memory system is normalized by a length of a corresponding set of text segments used to generate the output.

7. The computer implemented method of claim 1, further comprising identifying a set of text segments having the first text segment and the corresponding first continuation text segment as the correct structured reading-order sequence of text segments based on the first score being higher than the second score.

8. A computing system comprising:
   a processing unit; and
   a non-transitory computer-readable medium communicatively coupled to the processing unit, wherein the processing unit is configured for executing program code stored on the non-transitory computer-readable medium and thereby performing operations comprising:
   accessing a probabilistic language model of observed word sequence patterns that computes (i) a first likelihood that a phrase obtained by splicing a text segment together with a continuation text segment has a correct reading order and (ii) a second likelihood that an additional phrase obtained by splicing the text segment together with another continuation text segment has the correct reading order, wherein the probabilistic language model is (i) trained with tokenized data obtained from a first text corpus for a given language and (ii) validated against a second text corpus distinct from the first text corpus, the tokenized data comprising tokens respectively corresponding to sets of textually encoded characters generated from the first text corpus;
   providing, to the probabilistic language model, (i) a first set of text segments having a first text segment and a corresponding first continuation text segment and (ii) a second set of text segments having the first text segment and a corresponding second continuation text segment,
   computing, with the probabilistic language model, a first score and a second score, the first score indicating a likelihood of the first text segment and the corresponding first continuation text segment providing a correct structured reading-order sequence, the second score indicating a likelihood of the first text segment and the corresponding second continuation text segment providing the correct structured reading-order sequence, and
   outputting, based on the first score and the second score, a reading order text extraction for sequencing a set of text strings on a display device.

9. The computing system of claim 8, wherein the probabilistic language model comprises a recurrent neural network trained on a text corpus.

10. The computing system of claim 9, wherein the recurrent neural network comprises a long short term memory system that learns language patterns over entire sentences.

11. The computing system of claim 10, the operations further comprising reducing memory consumption by the long short term memory system by sampling selected target words from a noise distribution.

12. The computing system of claim 10 wherein an output of the long short term memory system is normalized by a length of a corresponding set of text segments used to generate the output.

13. The computing system of claim 8, further comprising identifying a set of text segments having the first text segment and the corresponding first continuation text segment as a correct structured reading-order sequence of text segments based on the first score being higher than the second score.

14. A non-transitory computer-readable medium having executable program code stored thereon that, when executed by a processing unit, configures the processing unit to perform operations comprising:
   accessing a probabilistic language model of observed word sequence patterns that computes (i) a first likelihood that a phrase obtained by splicing a text segment together with a continuation text segment has a correct reading order and (ii) a second likelihood that an additional phrase obtained by splicing the text segment together with another continuation text segment has the correct reading order, wherein the probabilistic language model is (i) trained with tokenized data obtained from a first text corpus for a given language and (ii) validated against a second text corpus distinct from the first text corpus, the tokenized data comprising tokens respectively corresponding to sets of textually encoded characters generated from the first text corpus;
   providing, to the probabilistic language model, (i) a first set of text segments having a first text segment and a corresponding first continuation text segment and (ii) a second set of text segments having the first text segment and a corresponding second continuation text segment;
   computing, with the probabilistic language model, a first score and a second score, the first score indicating a likelihood of the first text segment and the corresponding first continuation text segment providing a correct structured reading-order sequence, the second score indicating a likelihood of the first text segment and the corresponding second continuation text segment providing the correct structured reading-order sequence; and
   outputting, based on the first score and the second score, a reading order text extraction for sequencing a set of text strings on a display device.

15. The non-transitory computer-readable medium of claim 14, wherein the probabilistic language model comprises a recurrent neural network trained on a text corpus, wherein the recurrent neural network comprises a long short term memory system that learns language patterns over entire sentences.

16. The non-transitory computer-readable medium of claim 15, the operations further comprising reducing memory consumption by the long short term memory system by sampling selected target words from a noise distribution, wherein an output of the long short term memory system is normalized by a length of a corresponding set of text segments used to generate the output.

* * * * *